United States Patent
Sawada et al.

(10) Patent No.: US 8,175,779 B2
(45) Date of Patent: May 8, 2012

(54) VEHICLE DRIVING FORCE CONTROL APPARATUS AND METHOD

(75) Inventors: Hiroyuki Sawada, Okazaki (JP); Toshihiro Fukumasu, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 877 days.

(21) Appl. No.: 12/096,230

(22) PCT Filed: Feb. 19, 2007

(86) PCT No.: PCT/IB2007/000466
§ 371 (c)(1),
(2), (4) Date: Jun. 5, 2008

(87) PCT Pub. No.: WO2007/096768
PCT Pub. Date: Aug. 30, 2007

(65) Prior Publication Data
US 2008/0300760 A1    Dec. 4, 2008

(30) Foreign Application Priority Data

Feb. 23, 2006 (JP) ................................. 2006-046912
Feb. 27, 2006 (JP) ................................. 2006-050311

(51) Int. Cl.
*G06F 7/00* (2006.01)
(52) U.S. Cl. ............... 701/54; 701/70; 701/83; 701/86; 701/91; 180/170; 180/197; 227/147; 396/447
(58) Field of Classification Search .................... 701/70, 701/83, 86, 91; 180/170, 197; 227/147; 396/447
See application file for complete search history.

(56) References Cited

U.S. PATENT DOCUMENTS

| 6,330,504 | B1 * | 12/2001 | Toukura et al. ................ 701/54 |
| 6,602,161 | B2   | 8/2003  | Hemmingsen et al. |
| 7,317,978 | B2 * | 1/2008  | Ashizawa et al. ............... 701/54 |
| 2003/0004631 | A1 | 1/2003  | McGrath et al. |
| 2003/0116130 | A1 * | 6/2003 | Kisaka et al. ............ 123/406.45 |

FOREIGN PATENT DOCUMENTS

| EP | 0 449 160 A2 | 10/1991 |
| EP | 0 595 505 A2 | 5/1994 |
| EP | 1 529 947 A1 | 5/2005 |
| JP | 05-196062 A | 8/1993 |
| JP | 09-014116 A | 1/1997 |
| JP | 09-291835 A | 11/1997 |
| JP | 2001-057714 A | 2/2001 |
| JP | 2001-200741 A | 7/2001 |
| JP | 2001-328456 A | 11/2001 |
| JP | 2002-349331 A | 12/2002 |
| JP | 2003-41987 A | 2/2003 |
| JP | 2003-333710 A | 11/2003 |
| JP | 2004-068702 A | 3/2004 |
| JP | 2004-245153 A | 9/2004 |

* cited by examiner

*Primary Examiner* — Thomas Black
*Assistant Examiner* — Luke Huynh
(74) *Attorney, Agent, or Firm* — Sughrue Mion, PLLC

(57) ABSTRACT

A program is executed which includes a step (S100) of calculating a base required driving force, a step (S200) of calculating a reference driving force, a step (S400) of calculating a final required driving force on which a vibration suppression filtering process has been performed when the base required driving force is greater than a reference driving force, and a step (S500) of calculating a final required driving force on which the vibration suppression filtering process has not been performed when the base required driving force is equal to or less than the reference driving force.

17 Claims, 8 Drawing Sheets

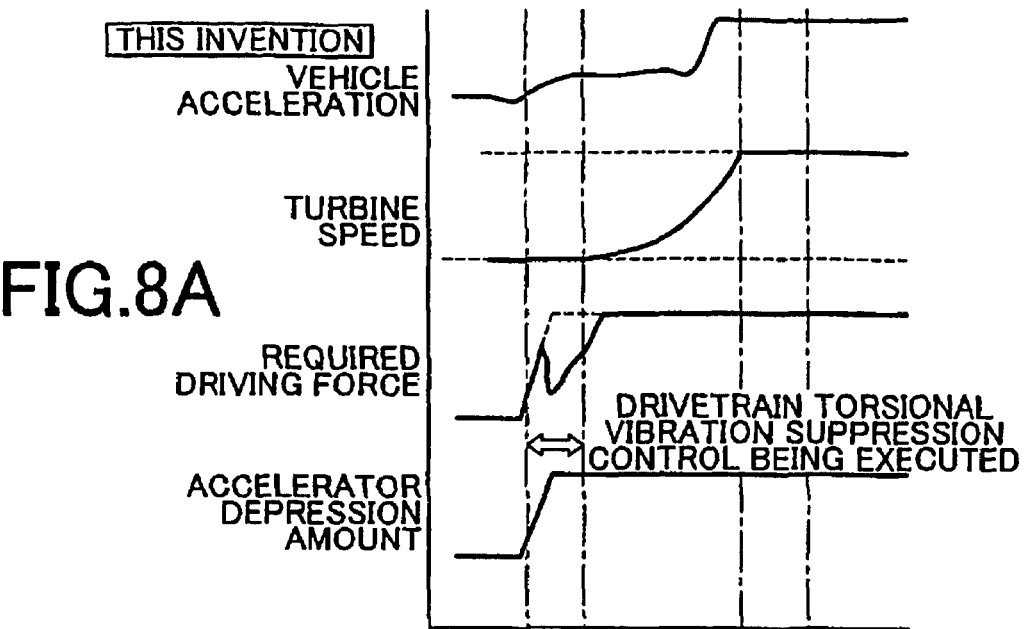
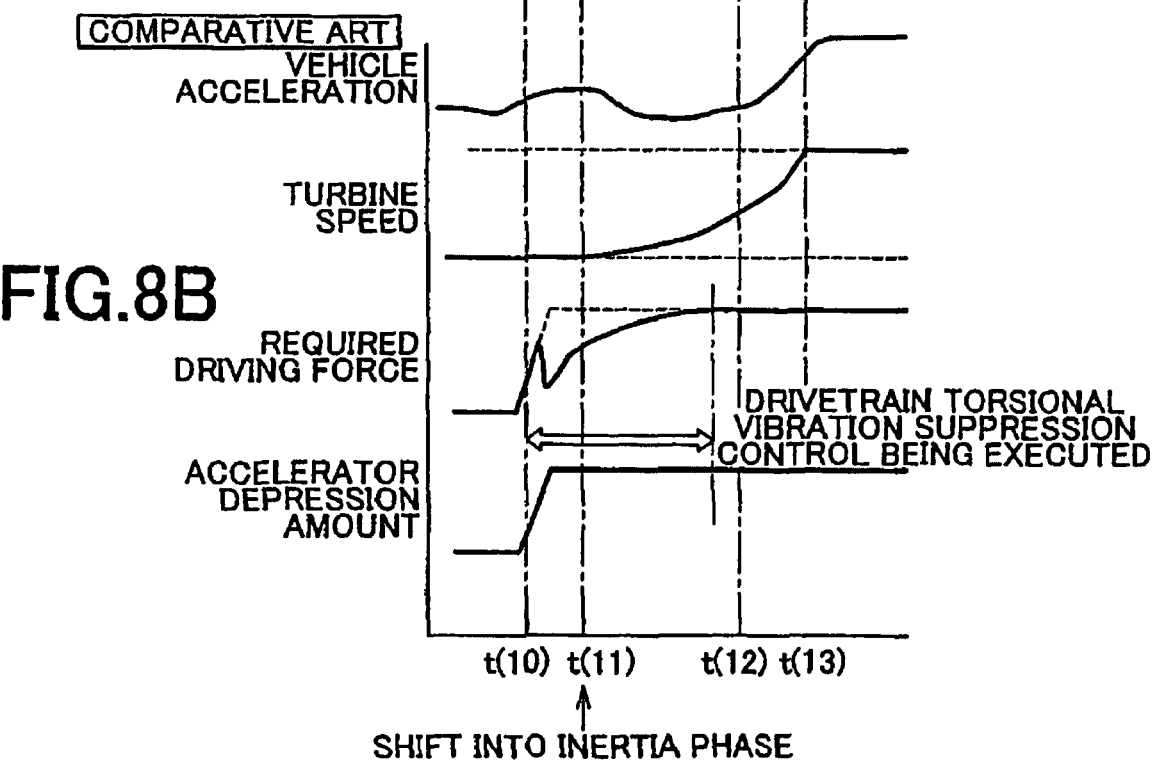
SHIFT INTO INERTIA PHASE

VEHICLE DRIVING FORCE CONTROL APPARATUS AND METHOD

BACKGROUND OF THE INVENTION

1. Field of the Invention

The invention relates to a vehicular driving force control apparatus of a vehicle having a powertrain formed by a drive source and a transmission, and to a vehicular driving force control method. More particularly, the invention relates to an apparatus and method which controls the driving force of a vehicle to suppress torsional vibration in the drivetrain.

2. Description of the Related Art

In a vehicle, the drivetrain often generates unpleasant vibrations during acceleration at which time there is an increase in the engine load. These unpleasant vibrations are mainly caused by torsional vibration of the drive shaft in the drivetrain, and are generated when engine torque that has increased with an increase in engine load includes a resonant frequency component of the drivetrain. This torsional vibration becomes more prominent the greater the required driving force (i.e., the target driving force).

Japanese Patent Application Publication No. JP-A-2003-41987 describes a control apparatus that reliably detects the manner of acceleration that includes this kind of resonant frequency component of the drivetrain and reduces the vibration. This control apparatus includes accelerator depression amount detecting means, engine speed detecting means, engine load change predicting means, filtering means, and torque reducing means. The accelerator depression amount detecting means detects a value related to the accelerator depression amount. The engine speed detecting means detects a value related to the engine speed. The engine load change predicting means predicts a change over time in a value related to the engine load in a predetermined period of time from an operation to increase the accelerator depression amount. This prediction is based on a value related to the accelerator depression amount and the value related to the engine speed when an operation by a driver to increase the accelerator depression amount has been detected based on the detection results from the accelerator depression amount detecting means. The filtering means extracts a resonant frequency component of the vehicle drivetrain from the change over time in the value related to the engine load that was predicted by the engine load change predicting means. The torque reducing means reduces the engine torque corresponding to the resonant frequency component at a timing that corresponds to the resonant frequency component that was extracted by the filtering means.

According to this control apparatus, the resonant frequency component of the drivetrain is extracted from the change over time in the value related to the engine load that is predicted to actually occur, and the engine torque is reduced to reduce this extracted resonant frequency component. As a result, it is possible to reliably ascertain the time of acceleration that will generate vibration in the drivetrain to include the resonant frequency component, while reliably reducing the vibration in the drivetrain caused by this resonant frequency component.

As described above, torsional vibration in the drivetrain becomes more prominent the greater the input to the powertrain (i.e., the greater the required driving force (target driving force)). Therefore, when the input to the powertrain is relatively large, it is effective to set the gain of the filter that extracts the resonant frequency component in the drivetrain relatively high and reduce the engine torque. On the other hand, when the input to the powertrain is small, a large amount of torsional vibration will essentially not occur. Therefore, if the engine torque is reduced using the same gain that is used when the input to the powertrain is relatively large, the effect of torsional vibration suppression is not as visible, and moreover, the response deteriorates significantly from the reduction in engine torque, resulting in deterioration of drivability and the like.

However, in the foregoing publication, there is no mention of these problems with the described control apparatus. That is, the control apparatus described above attempts to eliminate the resonant frequency component that causes torsional vibration in the drivetrain with a uniform gain during acceleration, regardless of the amount of input to the powertrain. As a result, it is not possible to solve the problem of response deteriorating when the target driving force is small.

Further, the foregoing control apparatus attempts to reduce the engine torque that corresponds to the resonant frequency component in order to suppress torsional vibration in the drivetrain. However, if control to suppress torsional vibration in the drivetrain is executed by reducing the engine torque while shift control is being executed (particularly with a power-on downshift), the engine torque may be insufficient. As a result, the engine speed will not increase quickly even after the shift into the inertia phase during shift control so it takes time to reach the synchronous speed after the shift. As a result, good shift control may not be able to be realized, with various problems possibly occurring such as a delay in the shift timing, an unpleasant sensation being felt during shifting, and delayed response after a shift.

SUMMARY OF THE INVENTION

This invention thus provides a vehicular driving force control apparatus and control method which is able to suppress vibration in a drivetrain.

A first aspect of the invention relates to a vehicular driving force control apparatus. This vehicular driving force control apparatus includes setting means for setting a target driving force to be generated in a vehicle; predicting means for predicting vibration generated in the vehicle based on the target driving force; correcting means for correcting the target driving force by performing a filter process on the target driving force to reduce a frequency component of the predicted vibration; and changing means for changing a degree to which the filter process is reflected according to the amount of target driving force.

According to this vehicular driving force control apparatus, the target driving force to be generated in the vehicle is set as the required driving force according to the accelerator pedal depression amount or cruise control or the like. The vibration generated by outputting this target driving force (particularly the torsional vibration of the drivetrain from a resonant frequency) is then predicted, and the target driving force is corrected to reduce the frequency component of the predicted vibration. If the vibration component is reduced a large amount at this time, the driving force tends to decrease a large amount. As a result, acceleration response decreases. On the other hand, if an attempt is made to prevent a decrease in the acceleration response, the driving force is unable to be greatly reduced and the vibration component is unable to be reduced much. Therefore, when the target driving force is small, at which time torsional vibration of the drivetrain is not a large problem, the degree to which the filter process is reflected is reduced to give priority to acceleration response (over vibration suppression). When the target driving force is relatively large, on the other hand, priority is given to suppression control (over acceleration response) and the degree to which the filter process is reflected is increased. As a result, a vehicular driving force control apparatus is able to be provided that enables an acceleration feeling that matches the preference of the driver to be realized and vibration of the drivetrain to be suppressed without the target driving force being affected.

In the foregoing vehicular driving force control apparatus, the correcting means may correct the target driving force by calculating a subject driving force on which the filter process is to be performed based on the target driving force and filter processing the subject driving force.

According to this vehicular driving force control apparatus, the filter process is performed on the driving force that is the difference of the target driving force itself minus the reference driving force which corresponds to a driving force where any vibration generated thereby will not be a problem, for example. Therefore, an appropriate filter process can be executed.

In the foregoing vehicular driving force control apparatus, the correcting means may correct the target driving force by calculating a subject driving force on which the filter process is to be performed by subtracting a reference driving force from the target driving force and filter processing the subject driving force.

According to this vehicular driving force control apparatus, the filter process is performed on the driving force that is the difference of the target driving force itself minus the reference driving force. Therefore, an appropriate filter process can be executed.

In the foregoing vehicular driving force control apparatus, the greater the subject driving force is, the greater the target driving force in a region, in which the target driving force is greater than the reference driving force, is.

According to this vehicular driving force control apparatus, the greater the subject driving force, on which the filter process is to be performed, is, the greater the target driving force, is. Therefore, it is possible to filter process a large subject driving force with respect to a large target driving force.

The foregoing vehicular driving force control apparatus may also include means for prohibiting the filter process from being reflected when the target driving force is equal to or less than the reference driving force.

According to this vehicular driving force control apparatus, when the target driving force is equal to or less than the reference driving force (which corresponds to a driving force where any vibration generated thereby will not be a problem), the filter process is not reflected, e.g., the filter process by the correcting means is interrupted or the degree is changed to 0 by the changing means. Therefore, when the target driving force is equal to or less than the reference driving force, at which time the torsional vibration of the drivetrain is not a large problem, acceleration response is given priority.

In the foregoing vehicular driving force control apparatus, the changing means may change a gain for driving force on which the filter process has been performed.

According to this vehicular driving force control apparatus, the degree to which the filter process is reflected can be changed by changing the gain for the driving force that has been filter processed between 0 and 1, for example.

In the foregoing vehicular driving force control apparatus, the changing means may set the gain to 0 when changing the degree to prohibit the filter process from being reflected.

According to this vehicular driving force control apparatus, when the target driving force is equal to or less than the reference driving force (which corresponds to a driving force where any vibration generated thereby will not be a problem), the filter process is able to be not reflected by setting the gain for the driving force that has been filter processed to 0.

A second aspect of the invention relates to a vehicular driving force control method which includes setting a target driving force to be generated in a vehicle; predicting vibration generated in the vehicle based on the target driving force; correcting the target driving force by performing a filter process on the target driving force to reduce a frequency component of the predicted vibration; and changing a degree to which the filter process is reflected based on the target driving force.

A third aspect of the invention relates to a vehicular driving force control apparatus of a vehicle provided with a stepped automatic transmission. This vehicular driving force control apparatus includes setting means for setting a target driving force to be generated in the vehicle; predicting means for predicting vibration generated in the vehicle based on the target driving force; correcting means for correcting the target driving force by performing a filter process on the target driving force to reduce a frequency component of the predicted vibration; detecting means for detecting a shift operation of the automatic transmission; and changing means for changing a degree to which the filter process is reflected according to the shift operation.

According to this vehicular driving force control apparatus of a vehicle provided with a stepped automatic transmission, the target driving force to be generated in the vehicle is set as the required driving force based on the accelerator pedal depression amount or the like. The vibration generated by outputting this target driving force (particularly the torsional vibration of the drivetrain from a resonant frequency) is then predicted, and the target driving force is corrected and the generated driving force reduced to reduce the frequency component of the predicted vibration. If a shift operation is being performed, particularly after a shift into the inertia phase of a downshift, the input shaft rotation speed into the stepped automatic transmission does not easily increase due to the decrease in driving force generated by the driving source. Therefore, it takes time for the input shaft rotation speed to reach the synchronous speed after the shift, which delays the shift timing. When such a shift operation is detected, the degree to which the filter process is reflected is reduced to give priority to shift response (over vibration suppression). In any other case (i.e., when a shift operation is not detected), priority is given to vibration suppression and the degree to which the filter process is reflected is increased. As a result, a vehicular driving force control apparatus is able to be provided which can both realize excellent shift characteristics and suppress vibration in the drivetrain.

In the foregoing vehicular driving force control apparatus provided with a stepped automatic transmission, the detecting means may detect a shift into an inertia phase of a downshift of the automatic transmission; and the changing means may reduce the degree when the shift into the inertia phase is detected.

According to this vehicular driving force control apparatus of a vehicle provided with a stepped automatic transmission, when the degree to which the filter process is reflected is reduced after the shift into the inertia phase of a downshift, a decrease in driving force generated by the driving source is able to be avoided so the input shaft rotation speed into the stepped automatic transmission is able to be quickly increased. Therefore, the input shaft rotation speed quickly reaches the synchronous speed after the shift so there is no delay in the shift timing.

In the foregoing vehicular driving force control apparatus provided with a stepped automatic transmission, the changing means may reduce the degree by reducing the gain for driving force on which the filter process has been performed.

According to this vehicular driving force control apparatus of a vehicle provided with a stepped automatic transmission, the degree to which the filter process is reflected can be changed by changing the gain for the driving force that has been filter processed between 0 and 1, for example. That is, the degree to which the filter process is reflected can be reduced by reducing the gain.

In the foregoing vehicular driving force control apparatus provided with a stepped automatic transmission, the changing means may reduce the gain when the shift into the inertia phase is detected and change the gain to 0 when the shift is complete.

According to this vehicular driving force control apparatus of a vehicle provided with a stepped automatic transmission, the gain is set to 0 at the end of the shift so torque fluctuation from torsional vibration suppression control at the end of the shift can be eliminated.

A fourth aspect of the invention relates to a vehicular driving force control method of a vehicle provided with a stepped automatic transmission. This vehicular driving force control method includes setting a target driving force to be generated in the vehicle; predicting vibration generated in the vehicle based on the target driving force; correcting the target driving force by performing a filter process on the target driving force to reduce a frequency component of the predicted vibration; detecting a shift operation of the automatic transmission; and changing a degree to which the filter process is reflected based on the shift operation.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIGS. 8A and 8B are timing charts of a case where the required driving torque is increased in a stepped manner in the second example embodiment of the invention and a comparative example.

DETAILED DESCRIPTION OF THE PREFERRED EMBODIMENTS

Figure 1:
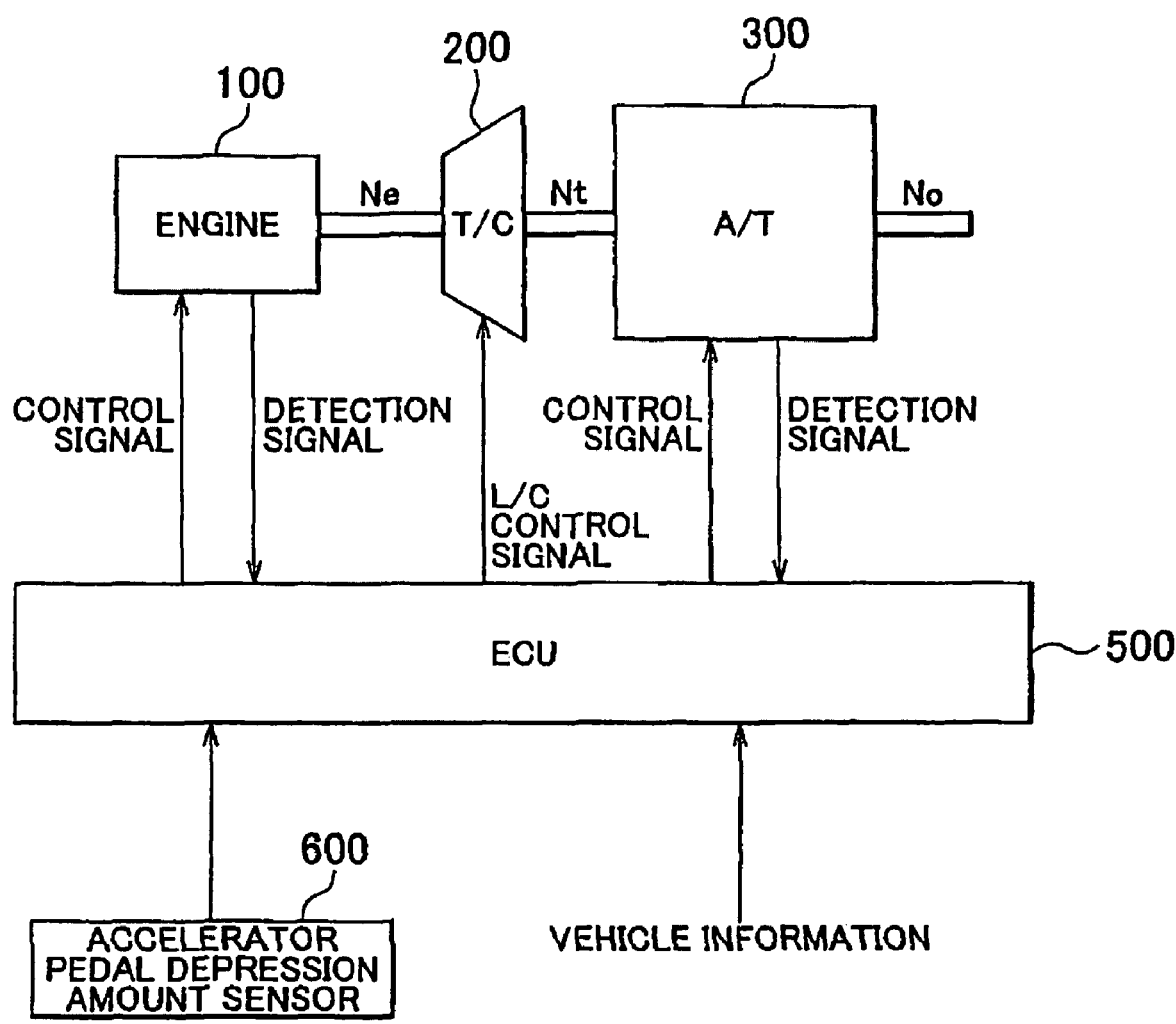
FIG. 1 is a control block diagram including an ECU which serves as the vehicular driving force control apparatus according to first and second example embodiments of the invention.

Hereinafter, example embodiments of the invention will be described in detail with reference to the accompanying drawings. In the following description, like parts with be denoted by like reference numerals. Like parts will also be referred to by same nomenclature and will have the same function. Therefore, detailed descriptions of those parts will not be repeated.

A powertrain of a vehicle that includes an ECU which serves as the driving force control apparatus according to first and second example embodiments of the invention will first be described with reference to FIG. 1.

As shown in FIG. 1, this vehicle includes an engine 100, a torque converter 200, an automatic transmission 300, an ECU (Electronic Control Unit) 500 that controls the engine 100, the torque converter 200, and the automatic transmission 300, and an accelerator pedal depression amount sensor 600 that outputs a signal indicative of an accelerator pedal depression amount to the ECU 500. The ECU 500 also inputs various other vehicle information such as vehicle speed information and information regarding the gear speed of the automatic transmission 300 (this information may also be gear ratio information when the automatic transmission includes a continuously variable transmission).

In the following description, driving force control applied to a powertrain that includes the engine 100, the torque converter 200, and the automatic transmission 300, as shown in FIG. 1, is described. It should be noted, however, that the invention is not limited to this structure. For example, the structure may also include a motor that assists the engine 100. In this case, the motor may be a motor-generator and also function as generator which is driven by driven wheels and the engine 100.

The ECU 500 outputs various control signals such as a throttle opening amount command signal to the engine 100, as well as receives various detection signals such as an engine speed signal.

Also, the ECU 500 outputs a control signal that instructs a lockup clutch of the torque converter 200 to apply or release (including a slip state). The ECU 500 also outputs a control signal, i.e., a hydraulic pressure command signal, to the automatic transmission 300 and receives detection signals such as an output shaft rotation speed signal from the automatic transmission 300. The ECU 500 can detect the vehicle speed based on this output shaft rotation speed signal.

The automatic transmission usually includes a fluid coupling and a gear type stepped shifting mechanism or a belt or traction type continuously variable shifting mechanism. In FIG. 1, the shifting mechanism is the automatic transmission 300 and the fluid coupling is the torque converter 200. The torque converter 200 includes a lockup clutch which directly connects, via a mechanical connection, a member on the drive side of the torque converter 200 (i.e., a pump impeller on the engine 100 side) to a member on the driven side (i.e., a turbine runner on the automatic transmission 300 side) in a lockup region where the lockup clutch is applied. As a result, both ride comfort and an improvement in fuel efficiency can be achieved. The lockup region is usually set based on, for example, the vehicle speed and the throttle opening amount.

The accelerator pedal depression amount sensor 600 detects the depression amount of the accelerator pedal that is operated by the driver. Alternatively, a throttle valve opening amount sensor may be used instead of the accelerator pedal depression amount sensor 600.

The ECU 500 according to this example embodiment executes control to suppress torsional vibration during acceleration (hereinafter simply referred to as "torsional vibration suppression control during acceleration") which will hereinafter be described. It should be noted, however, that the torsional vibration suppression control during acceleration is not limited to the control mode described hereinafter.

When the accelerator pedal of the vehicle is depressed in a manner in which the response is so-called stepped in which the amount of change in the depression amount of the accelerator pedal per unit time exceeds a predetermined value, essentially all of the vibration frequency components are included in the torque generated by the engine 100. Thus, the resonant frequency component of the drivetrain during acceleration is also included. This resonant frequency component of the drivetrain, however, exists in each gear speed. That is, this resonant frequency component can be assumed to be around 2 Hz in first speed, around 4 Hz in second speed, around 6 Hz in third speed, around 8 Hz in fourth speed, and around 10 Hz in fifth speed. Such resonant frequency components of 2 Hz to 10 Hz are all included when the accelerator pedal is depressed in a manner resulting in a stepped response.

In order to prevent vibration in the drivetrain during acceleration, the ECU 500 predicts the change over time in the load of the engine 100 that will probably be realized by that acceleration based on the vehicle speed and the gear ratio at the start of acceleration, for example, and then predicts the frequency components of the vibration generated by that predicted change over time. The ECU 500 then extracts the resonant frequency component corresponding to the gear ratio from the frequency components of the generated vibration, and performs a filtering process with a filter (hereinafter also referred to as a "notch filter") that allows all but that resonant frequency component to pass through. The ECU 500 then adjusts the degree of filtering action to remove the resonant frequency component by multiplying the gain that changes depending on the vehicle state (hereinafter also referred to as "notch filter gain") by the difference between the driving force to be filtered (hereinafter referred to as "filtering subject driving force") in order to remove the resonant frequency component and the driving force that was filtered. Incidentally, control is performed to reduce the torque (i.e., driving force) of the engine 100 by the amount of torque of the extracted resonant frequency component. In actuality, the torque of the engine 100 is reduced by decreasing the opening amount of the throttle valve.

In the ECU 500 which serves as the control apparatus according to this first example embodiment, the torsional vibration suppression control described above is executed only when a base driving force F(base) calculated based on the accelerator pedal depression amount and the like is greater than a reference driving force F.

The control structure of the program executed by the ECU 500 which serves as the control apparatus according to this example embodiment will now be described with reference to FIG. 2.

In step S100, the ECU 500 calculates the base required driving force F(base) based on the accelerator depression amount. This base required driving force F(base) is not limited to being calculated based on the accelerator depression amount, however. For example, the base required driving force F(base) may also be calculated based on the required driving force from a cruise control system. Moreover, the base required driving force F(base) may also be calculated based on the accelerator depression amount and the required driving force from a cruise control system.

In step S200, the ECU 500 calculates the reference driving force F. This reference driving force F is determined according to the response of the path along which the required driving force is actually transmitted as driving force on the tire axles (i.e., according to the response of the engine 100).

For example, less torsional rigidity results in vibration being absorbed and thus slower response so the reference driving force F is calculated to increase as the torsional rigidity decreases. On the other hand, better response of the engine 100 enables even a small amount of required driving force to be easily reflected so the reference driving force F is calculated to decrease as the engine response improves. The response of the engine 100 differs also depending on the engine speed so the reference driving force F is calculated to decrease as the response determined by the vehicle speed and the gear ratio improves. More specifically, the reference driving force is calculated by testing and mapped with the engine speed or the output shaft rotation speed of the automatic transmission 300 as a parameter.

In step S300, the ECU 500 determines whether the base required driving force F(base) is greater than the reference driving force F. If the base required driving force F(base) is greater than the reference driving force F (i.e., YES in step S300), the process proceeds on to step S400. If not (i.e., NO in step S300), the process proceeds on to step S500.

In step S400, the ECU 500 calculates a final required driving force F(final) as the difference between the base required driving force F(base) and the required driving force difference after the gain is reflected F(3) (i.e., F(base)−F(3)). In this case, suppressing vibration generated in the vehicle is given priority over response. The process of step S400 will be described in detail with reference to FIG. 3.

In step S500, the ECU 500 calculates the final required driving force F(final) as the base required driving force F(base). That is, when the base required driving force F(base) is equal to or less than the reference driving force F, the final required driving force F(final) becomes equal to the base required driving force F(base) and torsional vibration suppression control is not executed. That is, because the required driving force (i.e., the base required driving force F(base)) is small, vibration on a level which is problematic for the vehicle will not be generated so the torsional vibration suppression control is not executed. Conversely, if even in this case torsional vibration suppression control is executed and the notch filtering process is performed, the filtering process is performed so that the driving force becomes even less. As a result, even if the driver depresses the accelerator pedal, the vehicle will either not respond or if it does respond, the response will be poor leading to poor drivability.

Driving force control including torsional vibration suppression control during acceleration in step S400 in FIG. 2 will now be described with reference to FIG. 3.

Figure 2:
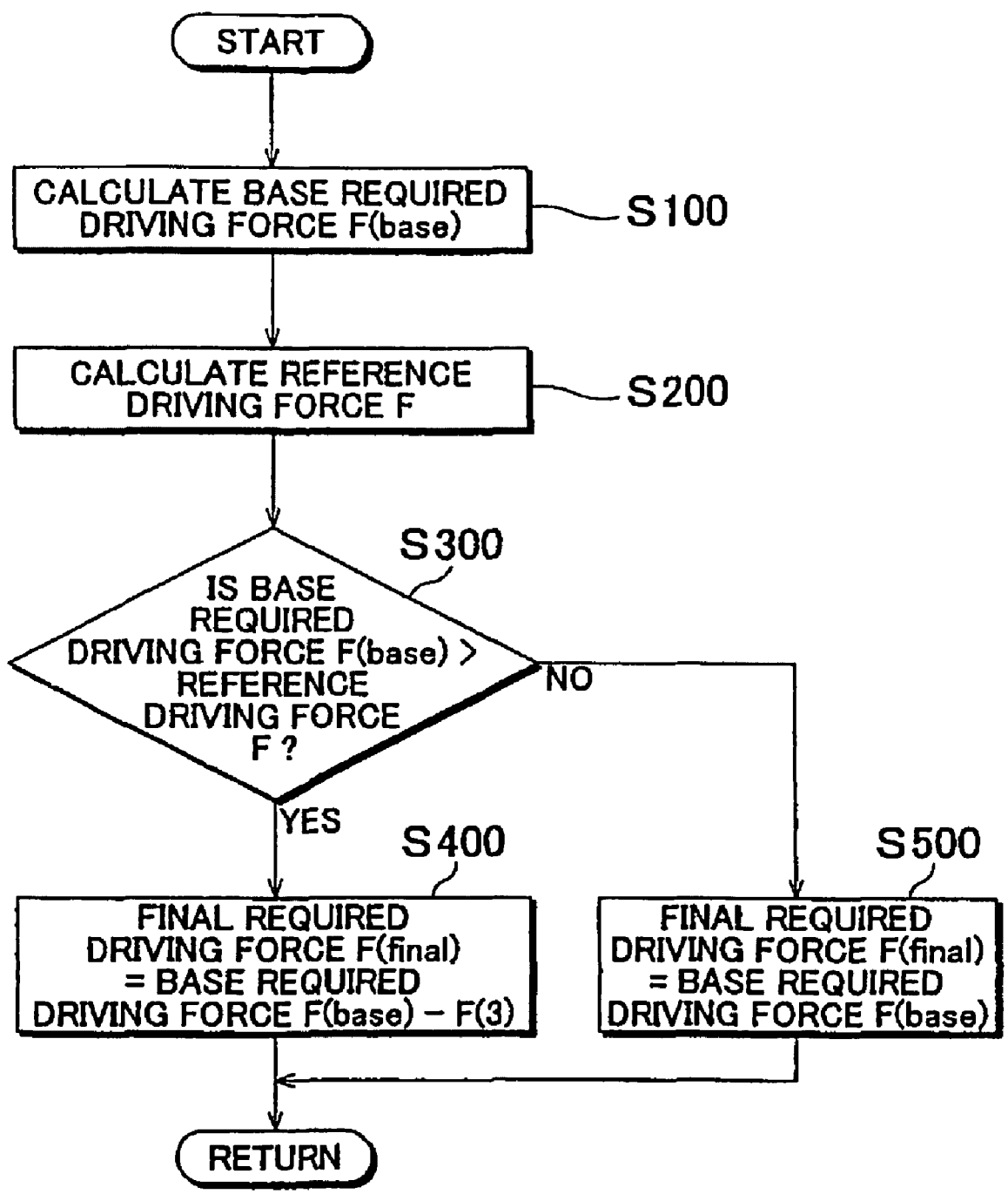
FIG. 2 is a flowchart illustrating the control structure of a program executed by the ECU according to the first example embodiment of the invention.
Figure 3:
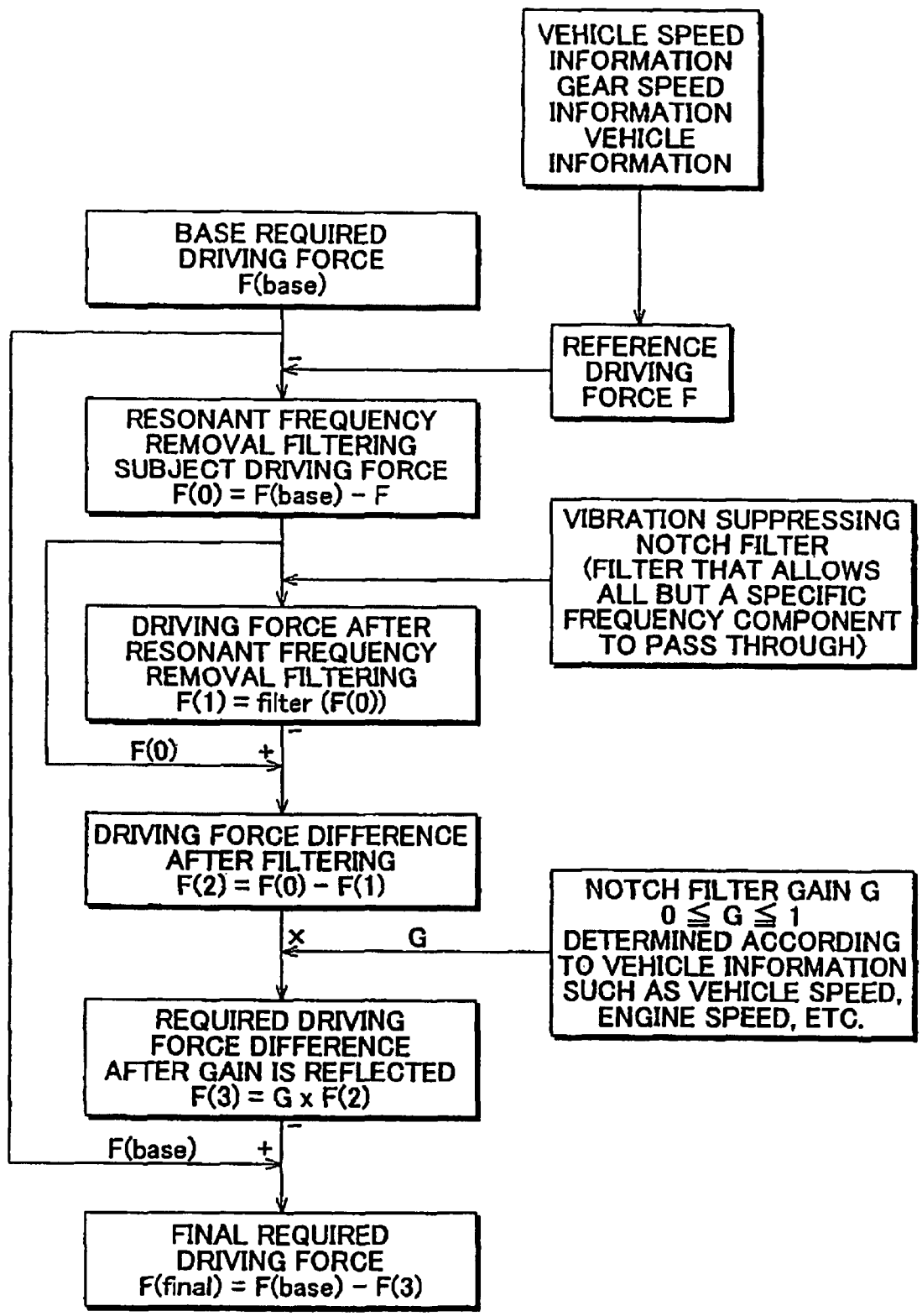
FIG. 3 is a view showing a final required driving force calculating process in step S400 in FIG. 2.

As shown in FIG. 3, first the base required driving force F(base) is calculated based on the accelerator depression amount and the like. Then the driving force which is to be notch filtered for vibration suppression in order to remove the resonant frequency component so as to suppress torsional vibration during acceleration is calculated as driving force F(0) to be filtered to remove the resonant frequency component (hereinafter referred to as "resonant frequency component removal filtering subject driving force F(0)"). This resonant frequency component removal filtering subject driving force F(0) is calculated as the difference between the base required driving force F(base) and the reference driving force F (i.e., F(0)=F(base)−F). In order for the process of step S400 in FIG. 2 to be performed the base required driving force F(base) must be larger than the reference driving force F. Therefore, the resonant frequency component removal filtering subject driving force F(0) is always a positive value.

The filtering process is performed on this resonant frequency component removal filtering subject driving force F(0) using the vibration suppressing notch filter (i.e., a filter that allows all but that resonant frequency component to pass through). As a result of this filtering process, a driving force after the resonant frequency component removal filtering F(1) is calculated as filter (F(0)). The frequency range that is not allowed through by the filtering process (i.e., the frequency range that causes torsional vibration in the vehicle) is determined according to vehicle information (such as the vehicle speed and the gear ratio).

The driving force difference after filtering F(2) is calculated by subtracting the driving force after resonant frequency component removal filtering F(1) (=filter (F(0)) from the resonant frequency component removal filtering subject driving force F(0) (i.e., F(2)=F(0)−F(1)). A required driving force difference after the gain is reflected F(3) is calculated by multiplying the notch filter gain G ($0 \leq G \leq 1$) by this driving force difference after filtering F(2) (i.e., F(3) G×F(2)). This notch filter gain G is used to adjust the effectiveness of the notch filter and is determined according to the vehicle state such as the vehicle speed, engine speed, and the like. A notch filter gain G of 0 is equivalent to the filtering process not being performed.

The value of this notch filter gain G is set according to the response of the engine 100, similar to the reference driving force F. For example, less torsional rigidity results in vibration being absorbed and thus slower response so the notch filter gain G is set to decrease as the torsional rigidity decreases. On the other hand, better response of the engine 100 enables even a small amount of required driving force to be easily reflected so the notch filter gain G is set to increase as the engine response improves. The response of the engine 100 differs also depending on the engine speed so the notch filter gain G is calculated to increase as the response, which is determined by the vehicle speed and the gear ratio, improves.

The final required driving force F(final) is calculated by subtracting the required driving force difference after the gain is reflected F(3) from the base required driving force F(base) (i.e., F(final)=F(base)−F(3)). This final required driving force F(final) is then converted into torque and the throttle valve opening amount is controlled so that the engine 100 outputs that torque.

In this way, the final required driving force F(final) is calculated using the required driving force difference after the gain is reflected F(3) so the effect from the resonant frequency component removal filtering is adjusted by the notch filter gain G.

The operation of the ECU 500 which serves as the control apparatus according to this first example embodiment will be described based on the foregoing structure and flowchart. In the following description, operation of the ECU 500 will first be described with reference to FIG. 4 presuming a case in which the base required driving force F(base) is greater than the reference driving force F (i.e., presuming a case in which the determination in step S300 is YES so step S400 (i.e., the process in FIG. 3) is executed). Then operation of the ECU 500 will be described with respect to a case in which the base required driving force F(base) is equal to or less than the reference driving force F.

[Case in which the Base Required Driving Force F(Base) is Greater than the Reference Driving Force F]

If the driver depresses the accelerator pedal a relatively large amount while the vehicle is running (assuming that the accelerator pedal is depressed in a stepped manner (i.e., not gradually but all at once)), the base required driving force F(base) is calculated based on that accelerator depression amount (step S100). This base required driving force F(base) is denoted by letter (A) in FIG. 4. The base required driving force F(base) increases in a stepped manner as shown by the dotted line.

Then, the reference driving force F is calculated using, for example, a map having the engine speed or the output shaft rotation speed of the automatic transmission 300 as a parameter (step S200). This reference driving force F is denoted by letter (B) in FIG. 4.

This description presumes that the base required driving force F(base) is larger than the reference driving force F so the filtering subject driving force F(0) is calculated as the difference between the base required driving force F(base) and reference driving force F (i.e., F(0)=F(base)−F) (F(0)>0). This filtering subject driving force F(0) is denoted by letter (C) in FIG. 4.

The notch filtering process is performed on this filtering subject driving force F(0) and the driving force after filtering F(1) is calculated as filter (F(0)). This driving force after filtering F(1) is denoted by letter (D) in FIG. 4. This driving force after filtering F(1) is a response waveform such as that shown by the alternate long and short dash line.

The difference between the driving force after filtering F(1) and the filtering subject driving force F(0) (i.e., F(0)−F(1)) is calculated as the driving force difference after filtering F(2). This driving force difference after filtering F(2) is denoted by letter (E) in FIG. 4.

The product of the notch filter gain G multiplied by the driving force difference after filtering F(2) (i.e., G×F(2)) is calculated as the required driving force difference after the gain is reflected F(3). This required driving force difference after the gain is reflected F(3) is denoted by letter (F) in FIG. 4.

The difference between the base required driving force F(base) and the required driving force difference after the gain is reflected F(3) (i.e., F(base)−F(3)) is calculated as the final required driving force F(final). This final required driving force F(final) is denoted by letter (G) in FIG. 4. This final required driving force F(final) is greater than the driving force after filtering F(1) and is a response waveform such as that shown by the solid line.

Figure 4:
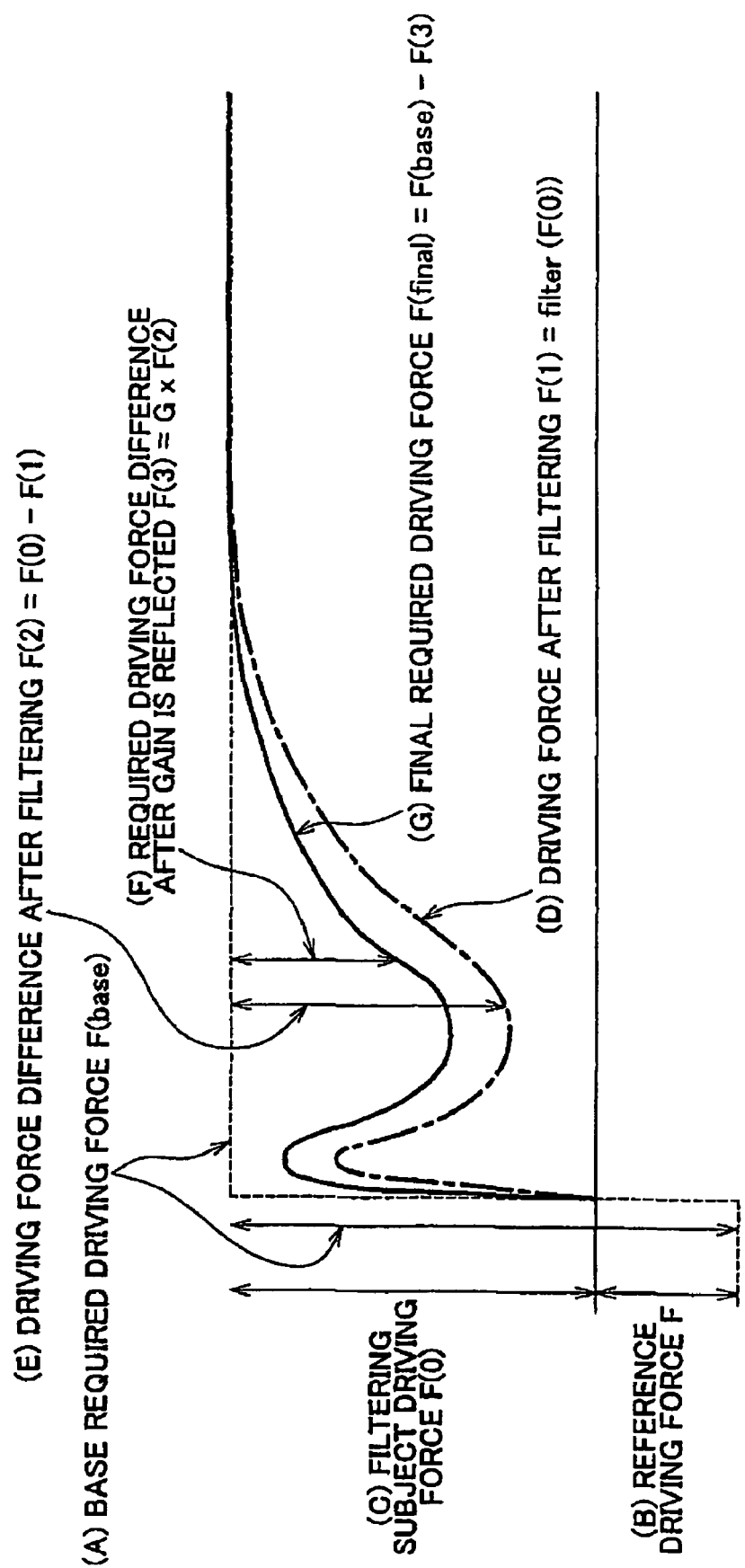
FIG. 4 is a timing chart of a case where required driving torque is increased in a stepped manner in the first example embodiment of the invention.

As is evident from the response waveform shown in FIG. 4, in this example embodiment, when driving force control is being executed to suppress torsional vibration during acceleration, the effectiveness of the notch filter is adjusted by multiplying the notch filter gain G by the driving force difference after filtering F(2), which is the difference of the filtering subject driving force F(0) minus the driving force after filtering F(1) by the notch filter. At this time, the notch filter gain G is set according to the vehicle state. As a result, a final required driving force F(final) that takes the response of the engine 100 into account can be calculated.

[Case in which the Base Required Driving Force F(Base) is Equal to or Less than the Reference Driving Force F]

If the driver depresses the accelerator pedal a small amount while the vehicle is running, the base required driving force F(base) is calculated based on that accelerator depression amount (step S100). Because this base required driving force F(base) is equal to or less than the reference driving force F (i.e., NO in step S300), the final required driving force F(final) is calculated as the base required driving force F(base). This indicates that torsional vibration suppression control will not be executed. Therefore, the filtering process prevents the response from becoming slower so even if there is a slight change in the accelerator depression amount, driving force can still be generated in the vehicle, thus preventing drivability from deteriorating.

As described above, according to the control apparatus according to this example embodiment, when the required target driving force (i.e., the base required driving force) is equal to or less than the reference driving force, a large amount of vibration is not generated so vibration suppression control processing (i.e., the notch filtering process) is not performed, thus priority can be given to response over suppression vibration. Even when the required target driving force (i.e., the base required driving force) is greater than the reference driving force such that the notch filtering process is performed, a final required driving force is calculated that has been adjusted by the notch filter gain after filtering. The notch filter gain is set based on vehicle information (such as the engine speed or the output shaft rotation speed of the automatic transmission) while the vehicle is running so the effectiveness of the vibration suppression that corresponds to the running state of the vehicle can be adjusted. That is, not performing (i.e., prohibiting) the vibration suppressing notch filtering process in the region where the required driving force is small, i.e., in the region in which torsional vibration of the drivetrain has little effect, enables the response when the accelerator depression amount is small to be ensured, for example, while performing the vibration suppressing notch filtering process in the region where the required driving force is large, i.e., in the region in which torsional vibration of the drivetrain has a large effect, enables vibration when the accelerator depression amount is relatively large to be suppressed, for example.

Incidentally, since the notch filtering process is not performed in the case where step S500 in FIG. 2 is performed, the process of step S500 in FIG. 2 can also be performed with the notch filter gain G in FIG. 3 set at 0.

Hereinafter the powertrain of the vehicle including an ECU which serves as the control apparatus according to a second example embodiment of the invention will be described with reference to FIG. 1.

The ECU 500 of this example embodiment receives the same detection signals and outputs the same control signals as it does in the first example embodiment, and is thus able to detect whether shift control of the automatic transmission 300 is being executed as well as determine the point at which the automatic transmission 300 shifts into the inertia phase. For example, when the difference between the input shaft rotation speed of the automatic transmission 300 before the shift, which is obtained by multiplying the output shaft rotation speed of the automatic transmission 300 by the gear ratio, and the actual input shaft rotation speed of the automatic transmission 300 (i.e., the turbine speed) is greater than a predetermined threshold value, the ECU 500 determines that the automatic transmission 300 has shifted into the inertia phase. Also, there is a response delay according to the clutch capacity with respect to a shift command (hydraulic pressure command value) output from the ECU 500 to the automatic transmission 300. This response delay is identified through testing, for example, and the ECU 500 may determine that the automatic transmission 300 has shifted into the inertia phase when the actual clutch capacity switches, taking this response delay into consideration. Further, the ECU 500 may also determine that the automatic transmission 300 has shifted into the inertia phase when a predetermined period of time has passed after the ECU 500 has output the shift command (i.e., hydraulic pressure command value) to the automatic transmission 300.

In the ECU 500 which serves as the control apparatus according to this example embodiment, the torsional vibration suppression control described above is executed at a time other than when the automatic transmission 300 is in the inertia phase during shift control. Therefore, the torque decrease in the engine 100 which results from torsional vibration suppression control is prevented during the inertia phase, and the turbine speed is quickly increased to synchronous speed after the shaft when there is a downshift, for example.

In this case, if the degree to which torsional vibration suppression control is reflected is abruptly made 0 at the same time the automatic transmission 300 shifts into the inertia phase, it may interfere with torque down control (another control being executed) of the engine 100 during the shift, for example. Therefore, the degree to which torsional vibration suppression control is reflected is made 0 immediately after the automatic transmission 300 shifts into the inertia phase, but in order to avoid the interference described above, the notch filter gain Q which will be described later, is slowly changed from the initial value (1 at most) to 0. Then, the notch filter gain G is set to become 0 by the end of the shift (the end of the inertia phase) at the latest, and the degree to which the torsional vibration suppression control is reflected is slowly (asymptotically) changed to 0. This is a characteristic of the control executed by the ECU 500 which serves as the control apparatus according to this example embodiment.

The control structure of a program executed by the ECU 500 which serves as the control apparatus according to the second example embodiment will now be described with reference to FIG. 5. Hereinafter, descriptions of steps in this example embodiment that are the same as steps in the first example embodiment will be omitted.

The ECU 500 according to the example embodiment determines in step S300 whether the base required driving force F(base) is greater than the reference driving force F. If the base required driving force F(base) is greater than the reference driving force F (i.e., YES in step S300), the process proceeds on to step S310. If not (i.e., NO in step S300), the process proceeds on to step S500.

In step S310, the ECU 500 determines whether shift control is being executed in the automatic transmission 300 and whether the automatic transmission 300 is shifting into the inertia phase. If shift control is being executed in the automatic transmission 300 and the automatic transmission 300 is shifting into the inertia phase (i.e., YES in step S310), the process proceeds on to step S320. If not (i.e., NO in step S310), the process proceeds on to step S400.

In step S320, the ECU 500 reduces the notch filter gain G. Using the notch filter gain G at the start of the inertia phase (when the automatic transmission 300 shifts into the inertia phase) as the initial value (not limited to G=1), the notch filter gain G is changed from that initial value to 0. This slow change of this initial value ($\neq 0$) of the notch filter gain G to 0 will be described in detail later. Then the process proceeds on to step S400.

The driving force control including the torsional vibration suppression control during acceleration in step S400 in FIG. 5 will now be described with reference to FIG. 6.

Figure 5:
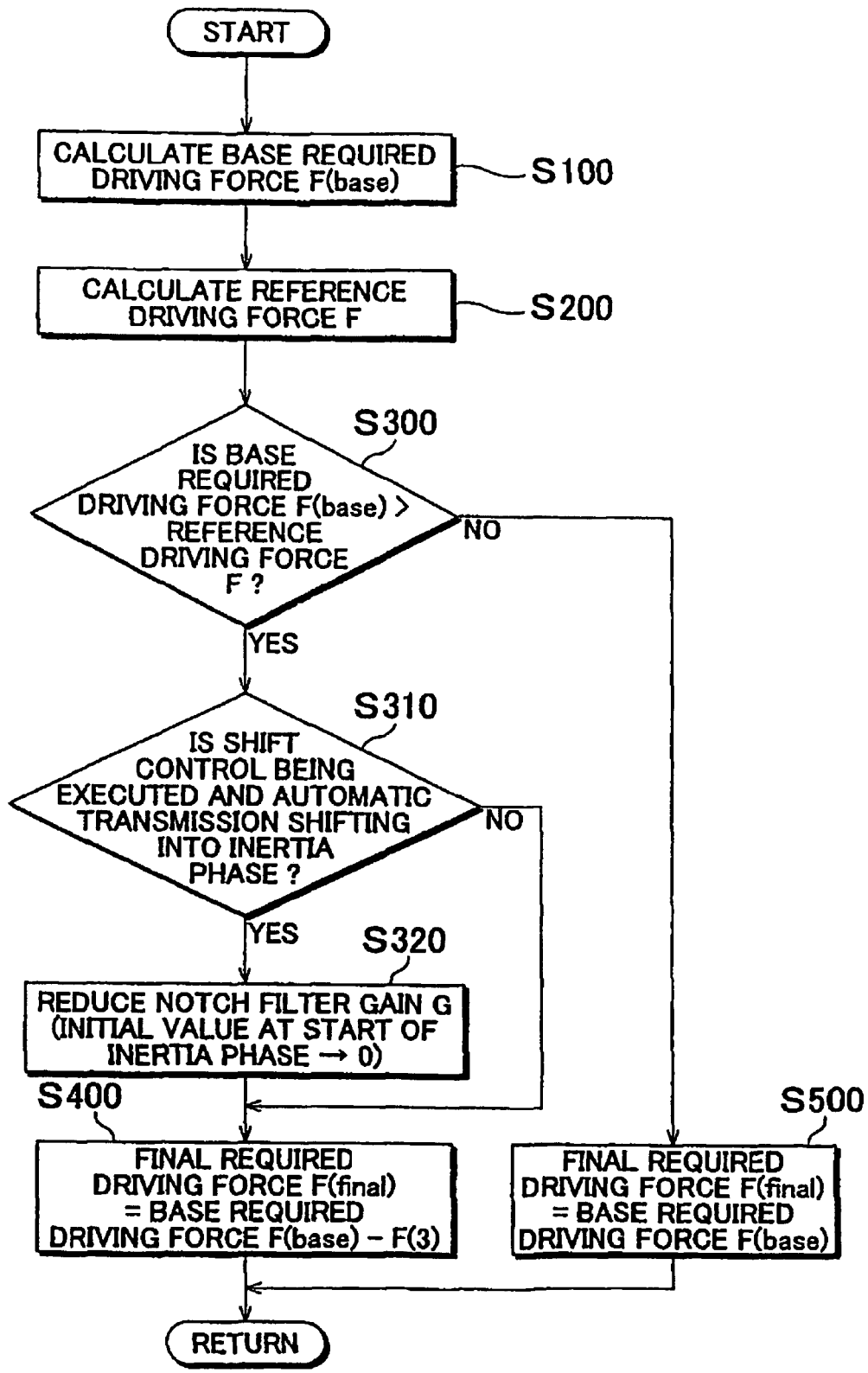
FIG. 5 is a flowchart illustrating the control structure of a program executed by the ECU according to the second example embodiment of the invention.
Figure 6:
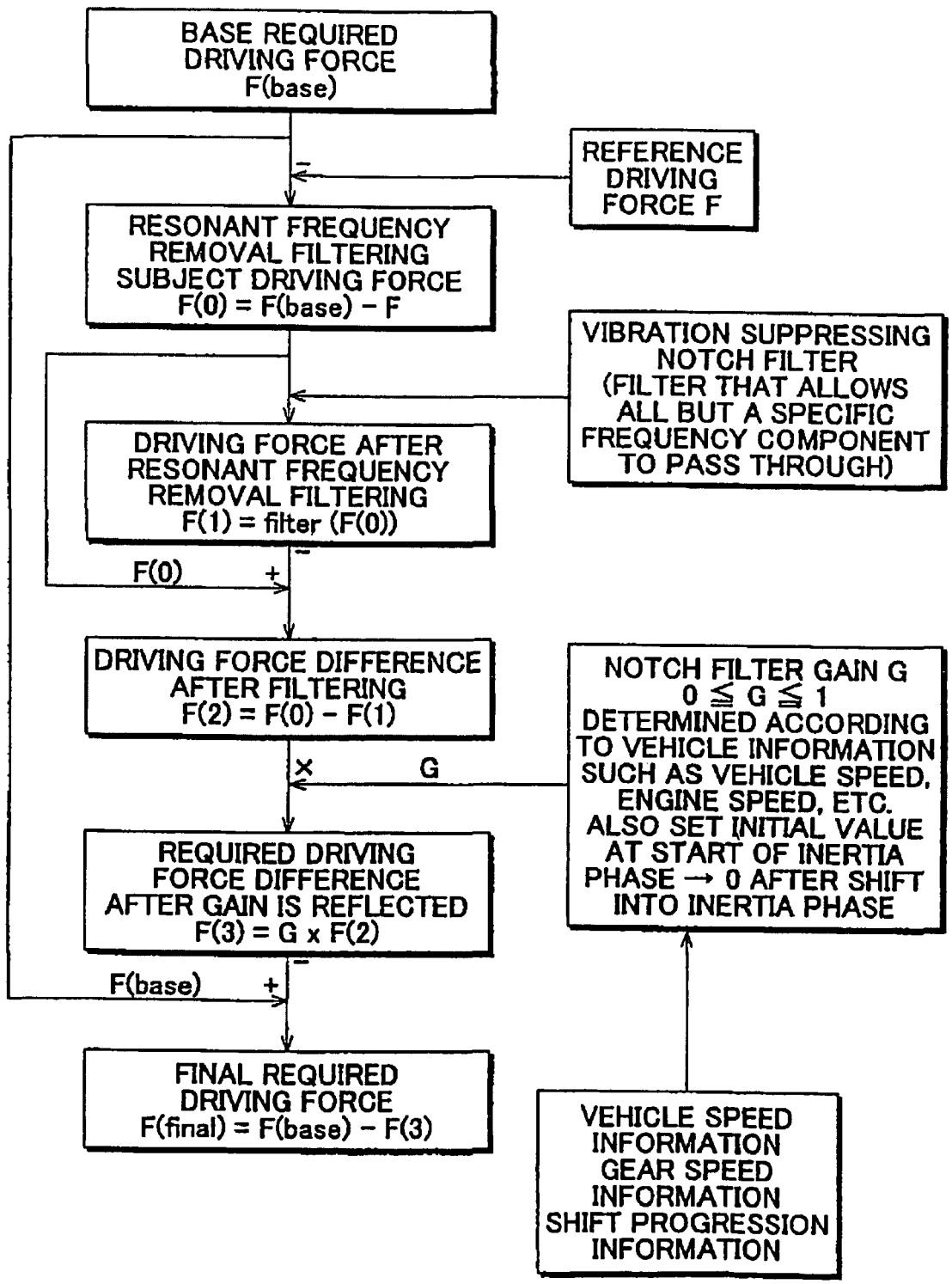
FIG. 6 is a view showing a final required driving force calculating process in step S400 in FIG. 5.

As shown in FIG. 6, first the base required driving force F(base) is calculated based on the accelerator depression amount and the like. Then the driving force which is to be notch filtered for vibration suppression in order to remove the resonant frequency component so as to suppress torsional vibration during acceleration is calculated as driving force F(0) to be filtered to remove the resonant frequency component (hereinafter referred to as "resonant frequency component removal filtering subject driving force F(0)"). This resonant frequency component removal filtering subject driving force F(0) is calculated as the difference between the base required driving force F(base) and the reference driving force F (i.e., F(0)=F(base)−F). In order for the process of step S400 in FIG. 5 to be performed the base required driving force F(base) must be larger than the reference driving force F. Therefore, the resonant frequency component removal filtering subject driving force F(0) is always a positive value.

The filtering process is performed on this resonant frequency component removal filtering subject driving force F(0) using the vibration suppressing notch filter (i.e., a filter that allows all but that resonant frequency component to pass through). As a result of this filtering process, a driving force after the resonant frequency component removal filtering F(1) is calculated as filter (F(0)). The frequency range that is not allowed through by the filtering process (i.e., the frequency range that causes torsional vibration in the vehicle) is determined according to vehicle information (such as the vehicle speed and the gear ratio).

The driving force difference after filtering F(2) is calculated by subtracting the driving force after resonant frequency component removal filtering F(1) (=filter (F(0)) from the resonant frequency component removal filtering subject driving force F(0) (i.e., F(2)=F(0)−F(1)). A required driving force difference after the gain is reflected F(3) is calculated by multiplying the notch filter gain G ($0 \leq G \leq 1$) by this driving force difference after filtering F(2) (i.e., F(3)=G×F(2)). This notch filter gain G is used to adjust the effectiveness of the notch filter and is determined according to the vehicle state such as the vehicle speed, engine speed, and the like. A notch filter gain G of 0 is equivalent to the filter process not being performed.

The value of this notch filter gain G is set according to the response of the engine 100, similar to the reference driving force F. For example, less torsional rigidity results in vibration being absorbed and thus slower response so the notch filter gain G is set to decrease as the torsional rigidity decreases. On the other hand, better response of the engine 100 enables even a small amount of required driving force to be easily reflected so the notch filter gain G is set to increase, as the engine response improves. The response of the engine 100 differs also depending on the engine speed so the notch filter gain G is calculated to increase as the response, which is determined by the vehicle speed and the gear ratio, improves.

Further, after the automatic transmission 300 shifts into the inertia phase during shift control, the notch filter gain G slowly changes from the initial value (≠0) at the time the automatic transmission 300 shifted into the inertia phase to 0. This state is shown in FIG. 7.

Figure 7:
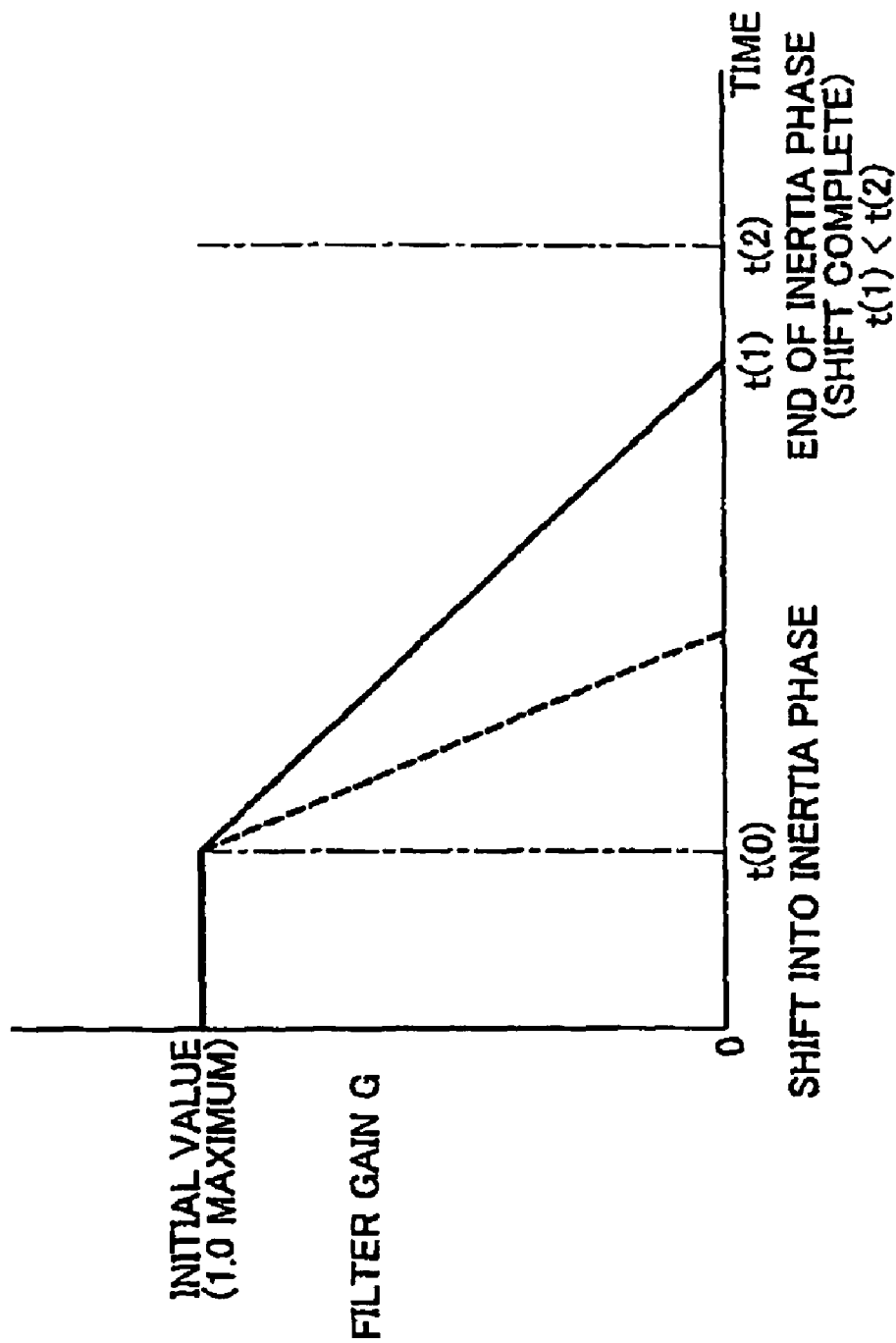
FIG. 7 is a graph showing the change over time in notch filter gain after a shift into the inertia phase.

As shown in FIG. 7, when the shift into the inertia phase is detected (i.e., YES in step S310), the notch filter gain G which was the initial value at the time of the shift into the inertia phase (i.e., time t(0)) changes such that the notch filter gain G at time t(1) (time t(1) is earlier than time t(2) which is when the inertial phase ends (i.e., when the shift ends)) becomes 0, for example (see the solid line in FIG. 4). Therefore, the notch filter gain G is 0 by at least at the time the shift ends so the affect from the torsional vibration suppression is eliminated.

In order to further improve the characteristics of the shift control, the notch filter gain G may be changed even faster to 0, as shown by the dotted line in FIG. 7. The slope of the decrease in this notch filter gain G is set so that no interference occurs between an increase in required driving force (due to a rise in turbine speed during a power-on downshift, for example) and torque down control (i.e., to improve shifting characteristics (shorten the shift duration in particular)) of the engine 100 which is executed in the shift transition phase.

The shift progression information in FIG. 6 is information for determining the shift into the inertia phase. The determination of the point at which the automatic transmission 300 shifts into the inertia phase is as described above so a detailed description thereof will not be repeated here.

The final required driving force F(final) is calculated by subtracting the required driving force difference after the gain is reflected F(3) from the base required driving force F(base) (i.e., F(final)=F(base)−F(3)). This final required driving force F(3) is converted into torque and the throttle valve opening amount is then controlled such that the engine 100 outputs that torque.

In this way, the final required driving force F(final) is calculated using the required driving force difference after the gain is reflected F(3) so the effect from the resonant frequency component removal filtering is adjusted by the notch filter gain G.

Further, the notch filter gain G is changed to 0 when the automatic transmission 300 is shifting into the inertia phase during shift control.

The operation of the ECU 500 which serves as the control apparatus according to this example embodiment will be described based on the structure and flowchart described above. In the following description, operation of the ECU 500 will be described with respect to a case in which the base required driving force F(base) is greater than the reference driving force F and presuming that the automatic transmission 300 is in the inertia phase during shift control for a power-on downshift (i.e., a case in which the determinations in steps S300 and S310 are YES so the process in step S320 is executed).

If the driver depresses the accelerator pedal a relatively large amount while the vehicle is running (assuming that the accelerator pedal is depressed in a stepped manner), the base required driving force F(base) is calculated based on that accelerator depression amount (step S100). At this time, a downshift line in the shift line graph (i.e., a map set by the vehicle speed and the throttle opening amount) is crossed so the ECU 500 determines that a downshift is being performed.

This description presumes that the base required driving force F(base) is greater than the reference driving force F (i.e., YES in step S300) so the filtering subject driving force F(0) is calculated as the difference between the base required driving force F(base) and reference driving force F (i.e., F(0)=F(base)−F) (F(0)>0).

The notch filtering process is performed on this filtering subject driving force F(0) and the driving force after filtering F(1) is calculated as filter (F(0)).

The difference between the filtering subject driving force F(0) and this driving force after filtering F(1) (i.e., F(0)−F(1)) is calculated as the driving force difference after filtering F(2).

The product of the notch filter gain G multiplied by the driving force difference after filtering F(2) (i.e., G×F(2)) is calculated as the required driving force difference after the gain is reflected F(3).

At this time, the description presumes that the automatic transmission 300 is in the inertia phase during shift control for a power-on downshift (i.e., YES in step S310). Therefore, with the notch filter gain G at the time of the shift into the inertia phase set as the initial value, the notch filter gain G is then asymptotically decreased from that value toward 0 until it becomes 0 when the inertia phase ends (i.e., when the shift is complete), as shown in FIG. 7.

The difference between the base required driving force F(base) and this required driving force difference after the gain is reflected F(3) (i.e., F(base)−F(3)) is calculated as the final required driving force F(final).

The changes over time in the vehicle acceleration, the turbine speed, the required driving force, and the accelerator depression amount when control is performed in this way are shown in FIGS. 8A and 8B. FIG. 8A shows a case with the invention while FIG. 8B shows a case with comparative art other than the invention (i.e., comparative art does not perform the process of step S320 in FIG. 5).

As shown in FIG. 8A, when the automatic transmission 300 shifts into the inertia phase (time t(11)) and the notch filter gain G is asymptotically reduced to 0 from the value at the time of the shift into the inertia phase (step S320), the degree to which torsional suppression control is reflected is reduced until torsional suppression control is no longer performed so that torque down control of the engine 100 will have a greater affect. Accordingly, the required driving force with respect to the accelerator pedal depression amount quickly increases. As a result, the turbine speed quickly reaches the synchronous rotation speed of the gear speed after the downshift (time t(12)) and the shift ends. That is, as shown by the arrow in FIG. 8A, the time during which the drivetrain torsional vibration suppression control is executed becomes shorter so the torque of the engine 100 increases quickly. This rise in torque quickly increases the turbine speed so the shift is completed quickly.

On the other hand, as shown in FIG. 8B, even when the automatic transmission 300 shifts into the inertia phase (time t(11)), when the notch filter gain G is not changed as it is with the invention, the degree to which the torsional suppression control is reflected does not decrease and torque suppression control of the engine 100 is executed just as it is when shift control is not being executed. Therefore, the required driving force with respect to the accelerator depression amount does not quickly increase. As a result, the turbine speed does not quickly reach the synchronous speed of the gear speed after the downshift. As shown in FIG. 5B, the shift ends at time t(13) which is later than time t(12). That is, as shown by the arrow in FIG. 8B, the time during which the drivetrain torsional vibration suppression control is executed increases so the torque of the engine 100 does not increase quickly. Therefore, the turbine speed does not increase quickly as a result of this delay in torque increase, so the shift is not completed quickly.

When the base required driving force F(base) is equal to or less than the reference driving force F (i.e., NO in step S300), the final required driving force F(final) is calculated as the base required driving force F(base). This indicates that torsional vibration suppression control will not be executed. Therefore, the filtering process enables driving force to be generated in the vehicle, even if there is a slight change in the accelerator depression amount, without the engine response becoming slow so drivability does not deteriorate.

As described above, with the control apparatus according to this example embodiment, when the required target driving force (i.e., the base required driving force) is equal to or less than the reference driving force, a large amount of vibration is not generated so the vibration suppression control process (i.e., the notch filtering process) is not performed. As a result, priority can be given to engine response over vibration suppression. Even when the required target driving force (i.e., the base required driving force) is greater than the reference driving force and the notch filtering process is performed, the notch filter gain G is changed to become 0 when shift control is being performed and the automatic transmission is shifting into the inertia phase. In this way, after the automatic transmission has shifted into the inertia phase, the final required driving force that has been adjusted by the notch filter gain G being decreased is calculated. The effectiveness of the vibration suppression according to the state of shift progression of the vehicle can be adjusted. That is, not performing (i.e., prohibiting) the vibration suppressing notch filtering process in the region where the required driving force is small, i.e., in the region in which torsional vibration of the drivetrain has little effect, enables the response when the accelerator depression amount is small to be ensured, for example, while performing the vibration suppressing notch filtering process in the region where the required driving force is large, i.e., in the region in which torsional vibration of the drivetrain has a large effect, enables vibration when the accelerator depression amount is relatively large to be suppressed, for example. Furthermore, even if the vibration suppressing notch filtering process is executed, the notch filter gain G is changed toward 0 after the automatic transmission has shifted into the inertia phase during shift control. As a result, engine torque reduction control by drivetrain torsional vibration suppression control is reduced so the turbine speed quickly reaches the synchronous speed after the shift and the shift can be completed quickly.

Incidentally, since the notch filtering process is not performed in the case where step S500 in FIG. 5 is performed, the process in step S500 in FIG. 5 is performed with the notch filter gain G in FIGS. 6 and 7 set at 0.

Also, in the foregoing description, a (power-on) downshift was used as one example of a shift, but this example embodiment is not limited only to a downshift.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

The invention claimed is:

1. A vehicular driving force control apparatus, comprising:
    a setting portion that sets a target driving force to be generated in a vehicle;
    a predicting portion that predicts vibration generated in the vehicle based on the target driving force;
    a correcting portion that corrects the target driving force by performing a filter process on the target driving force to reduce a frequency component of the predicted vibration; and
    a changing portion that increases a degree to which the filter process is reflected as the amount of target driving force increases.

2. The vehicular driving force control apparatus according to claim 1, characterised by further comprising:
    detecting portion that detects a shift operation of an automatic transmission of the vehicle,
    wherein the changing portion changes the degree to which the filter process is reflected based on the detected shift operation and the target driving force.

3. The vehicular driving force control apparatus according to claim 1, characterised in that the frequency component of the vibration is a resonant frequency of a drivetrain of the vehicle.

4. A vehicular driving force control apparatus according claim 1, characterised in that the correcting portion corrects the target driving force by calculating a subject driving force on which the filter process is to be performed based on the target driving force and filter processing the subject driving force.

5. A vehicular driving force control apparatus according to claim 1, characterised in that the correcting portion corrects the target driving force by calculating a subject driving force on which the filter process is to be performed by subtracting a reference driving force from the target driving force and filter processing the subject driving force.

6. The vehicular driving force control apparatus according to claim 5, characterised in that the greater the subject driving force is, the greater the target driving force in a region in which the target driving force is greater than the reference driving force.

7. The vehicular driving force control apparatus according to claim 5, characterised by further comprising a unit that prohibits the filter process from being reflected when the target driving force is equal to or less than the reference driving force (F).

8. The vehicular driving force control apparatus according to claim 1, characterised in that the changing portion changes a gain for driving force on which the filter process has been performed.

9. The vehicular driving force control apparatus according to claim 8, characterised in that the changing portion sets the gain to 0 when changing the degree to prohibit the filter process from being reflected.

10. The vehicular driving force control apparatus according to claim 1, characterised in that the setting portion sets the target driving force based on vehicle information of the vehicle.

11. The vehicular driving force control apparatus according to claim 10, characterised in that the vehicle information includes a depression amount of an accelerator pedal of the vehicle.

12. A vehicular driving force control apparatus of a vehicle having a stepped automatic transmission, comprising:
 a setting portion that sets a target driving force to be generated in the vehicle;
 a predicting portion that predicts vibration generated in the vehicle based on the target driving force;
 a correcting portion that corrects the target driving force by performing a filter process on the target driving force to reduce a frequency component of the predicted vibration;
 a detecting portion that detects a shift operation of the automatic transmission; and
 a changing portion that decreases a degree to which the filter process is reflected while the shift operation is executed.

13. The vehicular driving force control apparatus according to claim 12, characterised in that the detecting portion detects a shift into an inertia phase of a downshift of the automatic transmission; and the changing portion reduces the degree when the shift into the inertia phase is detected.

14. The vehicular driving force control apparatus according to claim 12, characterised in that the changing portion reduces the degree by reducing a gain for driving force on which the filter process has been performed.

15. The vehicular driving force control apparatus according to claim 14, characterised in that the changing portion reduces the gain when the shift into the inertia phase is detected and changes the gain to 0 when the shift is complete.

16. A vehicular driving force control method, comprising:
 setting a target driving force to be generated in a vehicle;
 predicting vibration generated in the vehicle based on the target driving force;
 correcting the target driving force by performing a filter process on the target driving force to reduce a frequency component of the predicted vibration; and
 increasing a degree to which the filter process is reflected as the target driving force increases.

17. A vehicular driving force control method of a vehicle provided with a stepped automatic transmission, comprising:
 setting a target driving force to be generated in the vehicle;
 predicting vibration generated in the vehicle based on the target driving force;
 correcting the target driving force by performing a filter process on the target driving force to reduce a frequency component of the predicted vibration;
 detecting a shift operation of the automatic transmission; and
 decreasing a degree to which the filter process is reflected while the shift operation is executed.

* * * * *